Patented Aug. 16, 1932

1,872,617

UNITED STATES PATENT OFFICE

ARTHUR L. BROWN, OF WILKINSBURG, PENNSYLVANIA, ASSIGNOR TO WESTINGHOUSE ELECTRIC & MANUFACTURING COMPANY, A CORPORATION OF PENNSYLVANIA

EMULSIFIED FLUID LUBRICANT

No Drawing.    Application filed February 21, 1927.    Serial No. 170,061.

My invention relates to liquid lubricants more specifically to emulsions that are useful as lubricants for machining operations and to methods of making the same.

It is among the objects of my invention to provide an emulsion containing a small but adequate amount of lubricating material to render it useful as a cutting oil for machining operations when it has been sufficiently diluted with water.

Another object of my invention is to provide a liquid emulsion that shall be permanent in that it will withstand heating to relatively high temperatures and cooling to relatively low temperatures without separation of the water and oil.

Still another object of my invention is to provide a concentrated emulsion, that shall be in liquid form and may be economically manufactured from inexpensive materials.

My lubricant or cutting lubricant is an emulsion consisting of a soap base, a neutral or mineral oil, such as paraffin oil, and water. The emulsion is preferably prepared in a concentrated form and then diluted for use by mixing it with water.

The valuable properties of my emulsion, such as permanence and persistence when heated, when cooled or when highly diluted, are obtained by accurately proportioning the ingredients and as a result of the manner in which the several ingredients are combined.

The soap base or emulsifier is first prepared. 300 pounds of elaine oil (commercial oleic acid) are heated in a kettle to 100°–110° C. and 300 pounds of water-white grade rosin are added, preferably in two equal portions, and the heating is continued until solution is complete. The solution is then cooled to about 95° C., and a solution of caustic potash containing 102 pounds of water and 47 pounds of 88–92% KOH (sufficient to saponify 73% of the elaine oil) is slowly added.

The contents of the kettle are heated from 95° to 101° C. for about an hour until the foam caused by the liberated carbonic acid disappears, and complete saponification has been effected between the caustic potash and a portion of the fatty acids. The liquid is then cooled.

The cooled thick soapy liquid is next thinned, and the soap content is increased and rendered more effective as an emulsifier by adding an alcohol, such as denatured alcohol, and ammonia. The ammonia, however, is not, as a rule, added in sufficient amount to saponify all the fatty acids. If concentrated ammonia or a dilute water solution thereof is added directly to the soap solution, a stringy, ropy product, which is not an efficient emulsifier, will result. I have found that the ropiness can be prevented by first mixing the ammonia with denatured alcohol and then adding the mixture to the soap solution. I mix 98 pounds of 95% denatured alcohol with 31 pounds of ammonia (26° Bé.) and slowly stir the mixture into the soap solution. The resulting solution is a syrupy liquid containing ammonia and potash soaps and is used to mix with the neutral oil in making the emulsion.

The concentrated liquid emulsion is made by adding a solution of 21 gallons of neutral oil, such as paraffin oil, and 3½ gallons of the soap base, previously mixed together, to a dilute solution of soda ash. Preferably, I add the above mixture to a solution made by adding 3.2 pounds of an alkaline compound, such as soda ash, to 24½ gallons of water. The soda ash is present in such quantity that it reacts with the remaining fatty acids and is preferably present in excess so as to act as a softening agent for the additional water that is added to the emulsion before it is utilized.

A concentrated emulsion may be made by adding the soda ash solution to a solution of the soap base in the oil in a crutcher, but when the ingredients are combined in this manner, the product gradually thickens when about ¾ of the dilute carbonate solution has been added. Then, after all the dilute carbonate solution has been added, the composition liquefies and produces an unstable emulsified liquid from which water and oil will separate in a few days.

I have discovered, however, that a permanent concentrated emulsion, which will not separate, even though it is heated to the boiling point or cooled to the freezing point, may be formed if the ingredients are properly combined. I place the soda ash solution in the crutcher and gradually add the solution of soap base in oil to the soda ash solution while stirring. The resulting compound contains about 50% water, and the emulsion will not break on standing, heating or cooling.

The concentrated emulsion is used to make a suitably thinned emulsion such as cutting oil or emulsion. One volume of the concentrated emulsion may be diluted with 9 volumes of water for making a cutting compound satisfactory for ordinary milling operations, and more dilute solutions, containing twice as much water as that used for the cutting compound, may be successfully made is desired.

My invention enables one to produce a liquid emulsion containing, for example, 7 volumes of water, a small amount of soda ash in solution, 6 volumes of paraffin oil and about 1 volume of the soap base or liquid emulsifier. The resulting product is an inexpensive compound, inasmuch as it contains less than 15% by volume, of the only ingredient of any considerable value. This product constitutes a permanent emulsion which may be diluted with water without further processing.

Although I have described a specific embodiment of my invention, I do not wish to be limited thereto, as modifications of my invention will suggest themselves to those skilled in the art without departing from the spirit of the invention. For example, instead of paraffin oil, I may use another neutral oil, such as red engine oil. Still other modifications, such as small changes in the proportions of some of the ingredients, may be made without departing from the spirit of my invention, as defined in the annexed claims.

I claim as my invention:

1. The method of making a liquid emulsion which comprises mixing a mineral oil with a liquid emulsifier comprising a mixture of alcohol and ammonia and fixed alkali soaps, and then adding said mixture to water which has been rendered slightly alkaline.

2. The method of making a liquid emulsion which comprises mixing a mineral oil with a liquid emulsifier comprising a mixture of alcohol and ammonia and fixed alkali soaps, and then slowly adding said mixture to a dilute solution of an alkali carbonate.

3. The method of making a liquid emulsion which comprises mixing a mineral oil with a liquid emulsifier comprising a mixture of alcohol and ammonia and fixed alkali soaps, and then slowly adding said mixture to a dilute solution of sodium carbonate.

4. A liquid emulsion comprising water, a mineral oil and a liquid emulsifier, said liquid emulsifier comprising a mixture of alcohol and ammonia and potash soaps consisting of the reaction product of about 3 parts oleic acid, 3 parts rosin, 1 part water, sufficient caustic potash to saponify about three-fourths of the oleic acid and sufficient ammonia to increase the soap content.

5. A stable liquid emulsion comprising a major proportion of a mineral oil and a minor proportion of an emulsifier comprising a mixture of ammonium and alkali metal oleates and resinates containing a substantial amount of each ingredient and sufficient water to emulsify the base and maintain the emulsion in a liquid form.

6. A stable liquid emulsion comprising a major proportion of a mineral oil and a minor proportion of an emulsifier comprising a mixture of alcohol in sufficient amount to prevent ropiness and ammonium and alkali metal soaps containing a substantial amount of each ingredient and a sufficient quantity of water to emulsify the base and maintain it in a liquid condition.

7. A stable liquid emulsion comprising a major proportion of a mineral oil and a minor proportion of an emulsifier comprising a mixture of ammonium and alkali metal oleates and resinates containing a substantial amount of each ingredient and a sufficient quantity of water which has been rendered slightly alkaline to emulsify the base and maintain it in a liquid condition.

8. A stable liquid emulsion comprising approximately 7 volumes of water, 6 volumes of a paraffin oil and one volume of an emulsifier, said emulsifier including sufficient alcohol to prevent ropiness and a mixture of ammonium and alkali metal soaps containing a substantial amount of each ingredient.

9. A stable liquid emulsion comprising approximately 7 volumes of water, 6 volumes of a paraffin oil and one volume of a liquid emulsifier comprising sufficient alcohol to prevent ropiness and a mixture of ammonium and alkali metal oleates and resinates containing a substantial amount of each of these ingredients.

In testimony whereof, I have hereunto subscribed my name this 16th day of February, 1927.

ARTHUR L. BROWN.